US008385568B2

(12) United States Patent
Goel et al.

(10) Patent No.: US 8,385,568 B2
(45) Date of Patent: Feb. 26, 2013

(54) LOW-PROFILE SPEAKER ARRANGEMENTS FOR COMPACT ELECTRONIC DEVICES

(75) Inventors: Ruchi Goel, San Jose, CA (US); Stephen R. McClure, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 442 days.

(21) Appl. No.: 12/698,957

(22) Filed: Feb. 2, 2010

(65) Prior Publication Data

US 2011/0164767 A1 Jul. 7, 2011

Related U.S. Application Data

(60) Provisional application No. 61/292,765, filed on Jan. 6, 2010.

(51) Int. Cl.
*H04R 25/00* (2006.01)
*G06F 17/00* (2006.01)

(52) U.S. Cl. .......................................... 381/182; 381/98

(58) Field of Classification Search .................. 381/396, 381/182, 186, 98; 455/128, 575.1
See application file for complete search history.

(56) References Cited

U.S. PATENT DOCUMENTS

| 6,321,070 B1 * | 11/2001 | Clark et al. | 455/575.1 |
| 2006/0094378 A1 * | 5/2006 | Murray et al. | 455/128 |
| 2006/0153417 A1 * | 7/2006 | Furuya | 381/396 |
| 2006/0188126 A1 * | 8/2006 | Andersen et al. | 381/396 |
| 2008/0149417 A1 * | 6/2008 | Dinh et al. | 181/145 |
| 2010/0046771 A1 * | 2/2010 | Gregg et al. | 381/98 |

FOREIGN PATENT DOCUMENTS

| DE | 11 47 983 B | 5/1963 |
| DE | 20 2004 011510 | 12/2004 |
| EP | 1 686 834 A1 | 8/2006 |

OTHER PUBLICATIONS

International Search Report and Written Opinion for International Application No. PCT/US2010/048016, mailed Jan. 24, 2011.

* cited by examiner

*Primary Examiner* — Yuwen Pan
*Assistant Examiner* — Phan Le
(74) *Attorney, Agent, or Firm* — Kramer Levin Naftalis & Frankel LLP

(57) ABSTRACT

A portable electronic device that provides audio sound output from multiple internal speakers to a common output audio opening in a housing of the portable electronic device is disclosed. In one embodiment, the multiple internal speakers are provided in close proximity to one another, such as adjacent to one another, and serve to produce audio sound pertaining to different audio channels. The sound (i.e., pressure waves) produced by each of the internal speakers is directed into a respective acoustic chamber and output via the output audio opening in the housing. Accordingly, the acoustic chambers for the multiple internal speakers can each direct their audio sound output to the same output audio opening in the housing. The respective acoustic chambers can be formed adjacent to one another with a structural barrier serving to separate the distinct acoustic chambers.

24 Claims, 6 Drawing Sheets

LOW-PROFILE SPEAKER ARRANGEMENTS FOR COMPACT ELECTRONIC DEVICES

CROSS-REFERENCE TO RELATED APPLICATION

This application claims priority benefit of U.S. Provisional Application No. 61/292,765, filed Jan. 6, 2010 and entitled "LOW-PROFILE SPEAKER ARRANGEMENTS FOR COMPACT ELECTRONIC DEVICES," which is hereby incorporated herein by reference.

BACKGROUND OF THE INVENTION

1. Field of the Invention

The present invention relates to speaker arrangements for electronic devices and, more particularly, for internal speaker arrangements for compact electronic devices.

2. Description of the Related Art

Today, it is popular for portable electronic devices, such as notebook computers, netbook computers, portable digital assistants (PDAs), smart phones, digital audio players (e.g., MP3 players) and the like, to produce audio sound. In some cases, the audio sound is produced as a mono, or single channel, output. In other cases, the audio sound is produced as a stereo, or left and right channels, output.

Portable electronic devices often provide audio jacks (i.e., audio connectors) that facilitate connection with headsets or headphones which provide personal external speakers for their users. Alternatively or additionally, portable electronic devices can provide one or more internal speakers that are able to be utilized for producing audio sound.

There is, however, an ongoing need to make portable electronic devices smaller and thinner. As portable electronic devices get smaller and thinner, there are increased difficulties in providing the same or greater functionality in a smaller area. With respect to audio sound output, a portable electronic device can utilize at least one or two speakers provided internal to the housing of the portable electronic device. Unfortunately, given the area constraints imposed on many portable electronic devices, it is increasingly difficult to provide high-quality audio sound output without hindering the ability to make portable electronic devices smaller and thinner. Consequently, there is a need for improved approaches to provide high-quality audio sound output from portable electronic devices as they get smaller and thinner.

SUMMARY OF THE INVENTION

The invention pertains to a portable electronic device that provides audio sound output from multiple internal speakers to a common output audio opening in a housing of the portable electronic device. In one embodiment, the multiple internal speakers are provided in close proximity to one another, such as adjacent to one another, and serve to produce audio sound pertaining to different audio channels. The sound (i.e., pressure waves) produced by each of the internal speakers is directed into a respective acoustic chamber and output via the output audio opening in the housing. Accordingly, the acoustic chambers for the multiple internal speakers can each direct their audio sound output to the same output audio opening in the housing. The respective acoustic chambers can be formed adjacent to one another with a structural barrier serving to separate the distinct acoustic chambers. The structural barrier can serve to seal against an internal surface of the housing for the portable electronic device. In such cases, at least a portion of the structural barrier can be compliant so as to create a reliable acoustic seal.

The invention can be implemented in numerous ways, including as a method, system, device, or apparatus. Several embodiments of the invention are discussed below.

According to one embodiment, a portable electronic device can include a housing for the portable electronic device. The housing can include a shared audio output port. The portable electronic device can also include a first audio chamber internal to the housing and having a first exit opening proximate to the shared audio output port, and a second audio chamber internal to the housing and having a second exit opening proximate to the shared audio output port. Additionally, the portable electronic device can include a first speaker driver provided in or coupled to the first audio chamber, and a second speaker driver provided in or coupled to the second audio chamber. The second audio chamber can be provided adjacent to the first audio chamber within the housing, such that the first audio chamber and the second audio chamber can share the shared audio output port.

According to another embodiment, a portable electronic device can include a housing having an audio output opening, and a speaker system provided internal to the housing. The speaker system can, for example, include at least: an acoustic chamber provided internal to the housing, a first speaker element and a second speaker element coupled to or disposed within the acoustic chamber and placed in close proximity to one another, and a compliant acoustic isolation structure disposed within the acoustic chamber and operable to isolate the acoustic chamber into first and second acoustic volumes. The first speaker element can be acoustically coupled to the first acoustic volume and the second speaker element can be acoustically coupled to the second acoustic volume, whereby both the first and second acoustic volumes exit at the audio output opening.

According to one embodiment, a method for assembling a portable electronic device can, for example, include the acts of: forming an external housing for a portable electronic device having a shared audio exit port; forming a pair of adjacent speaker chambers to be internal to the external housing and to exit through the single shared audio exit port of the external housing; and providing a pair of speaker drivers respectively acoustically coupled to the pair of adjacent speaker chambers.

According to another embodiment, a method for outputting audio sound from a housing of a portable electronic device can, for example, include the acts of: providing a first speaker driver internal to the housing and acoustically coupled to a first audio chamber, the first audio chamber having an exit opening corresponding to a shared opening in the housing; providing a second speaker driver internal to the housing and acoustically coupled to a second audio chamber, the second audio chamber having an exit opening corresponding to the shared opening in the housing; supplying first audio signals to the first speaker driver; supplying second audio signals to second speaker driver; producing first audio output from the first speaker driver in accordance with the first audio signals; directing the first audio output to the shared opening in the housing via the first audio chamber; producing second audio output from the second speaker driver in accordance with the second audio signals; and directing the second audio output to the shared opening in the housing via the second audio chamber.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

The invention pertains to a portable electronic device that provides audio sound output from multiple internal speakers to a common output audio opening in a housing of the portable electronic device. In one embodiment, the multiple internal speakers are provided in close proximity to one another, such as adjacent to one another, and serve to produce audio sound pertaining to different audio channels. The sound (i.e., pressure waves) produced by each of the internal speakers is directed into a respective acoustic chamber and output via the output audio opening in the housing. Accordingly, the acoustic chambers for the multiple internal speakers can each direct their audio sound output to the same output audio opening in the housing. The respective acoustic chambers can be formed adjacent to one another with a structural barrier serving to separate the distinct acoustic chambers. The structural barrier can serve to seal against an internal surface of the housing for the portable electronic device. In such cases, at least a portion of the structural barrier can be compliant so as to create a reliable acoustic seal.

Exemplary embodiments of the invention are discussed below with reference to FIGS. 1-8. However, those skilled in the art will readily appreciate that the detailed description given herein with respect to these figures is for explanatory purposes as the invention extends beyond these limited embodiments.

Figure 1:
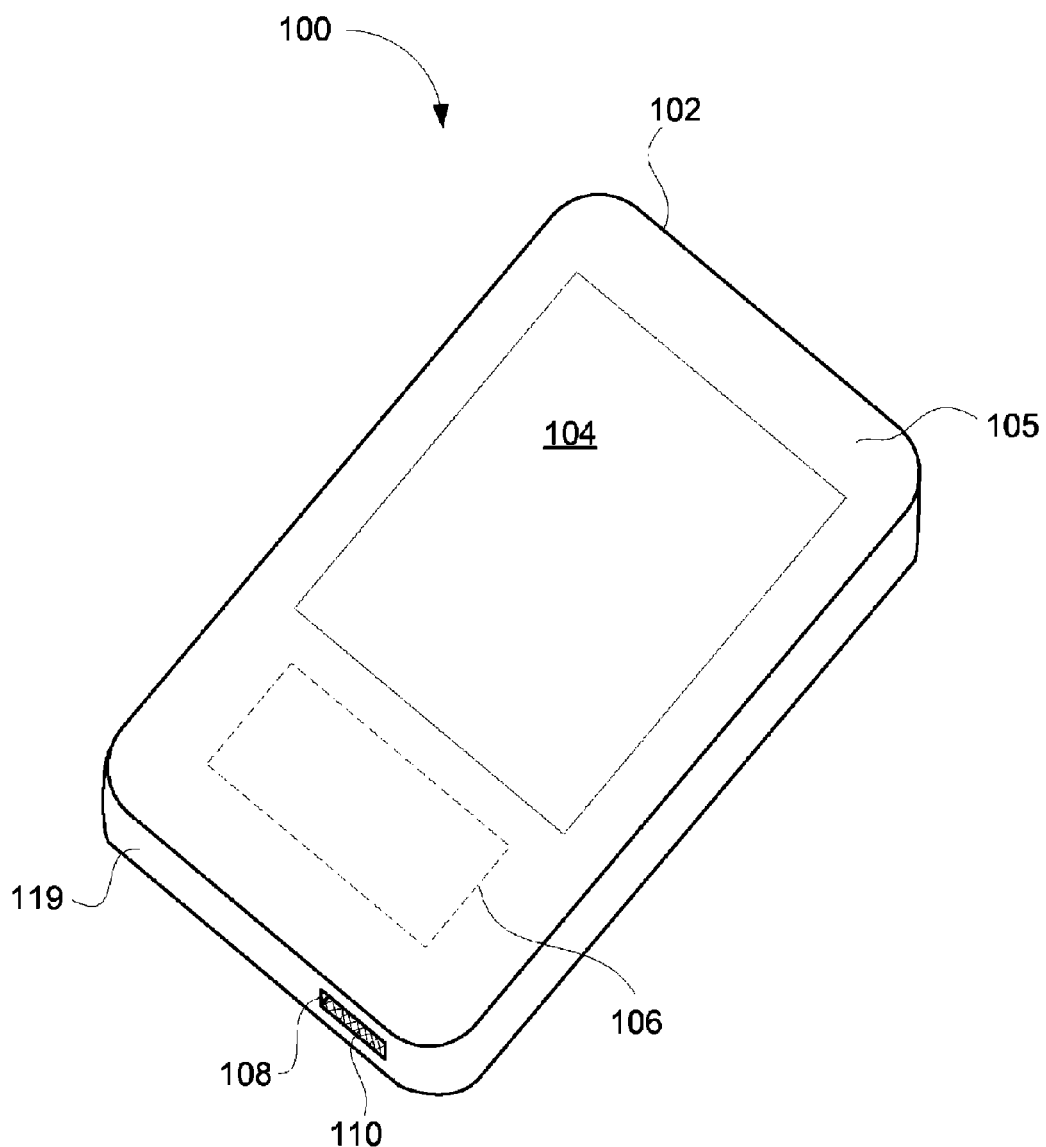
FIG. 1 is a perspective diagram of a portable electronic device according to one embodiment.

FIG. 1 is a perspective diagram of a portable electronic device 100 according to one embodiment. The portable electronic device 100 is a representative illustration for a portable electronic device. However, it should be understood that, in other embodiments, the size, scale, shape, configuration and/or appearance of the portable electronic device 100 can vary widely.

The portable electronic device 100 includes a housing 102 that provides an exterior surface for the portable electronic device 100. The portable electronic device 100 provides one or more functional capabilities that can be utilized by its user. In so doing, the portable electronic device can include at least one input/output component 104.

The user input/output component 104 typically includes one or more user input devices and/or one or more output device. The one or more user input devices can allow the user to interact with the portable electronic device. The one or more output devices can provide outputs from the portable electronic device to the user or another device. The input/output component 104 can, for example, pertain to one or more of a display, a touch screen, a touchpad, a keypad, a button, a dial, and etc. The portable electronic device 100 can also include an audio generating circuit 106. The audio generating circuit 106 is typically provided internal to the housing 102 of the portable electronic device 100. The audio generating circuit 106 can operate to produce audio signals that can be supplied to a plurality of speakers internal to the housing 102 of the portable electronic device 100. The speakers, in response to the audio signals, can produce audio sound that can be directed by way of one or more acoustic chambers to an audio output opening 108 in the housing 102 of the portable electronic device 100. In one embodiment, the audio output opening 108 can include a mesh cover 110 that serves to protect foreign matter from entering into the housing 102 of the portable electronic device 100 by way of the audio output opening 108.

The housing 102 of the portable electronic device 100 can also include an external connection port 108 (not shown). The external connection port 108 allows the portable electronic device 100 to be connected to a host device (e.g., personal computer) or other electronic devices (e.g., docking station), so as to exchange data or to charge a battery (not shown) utilized by the portable electronic device 100.

Figure 2:
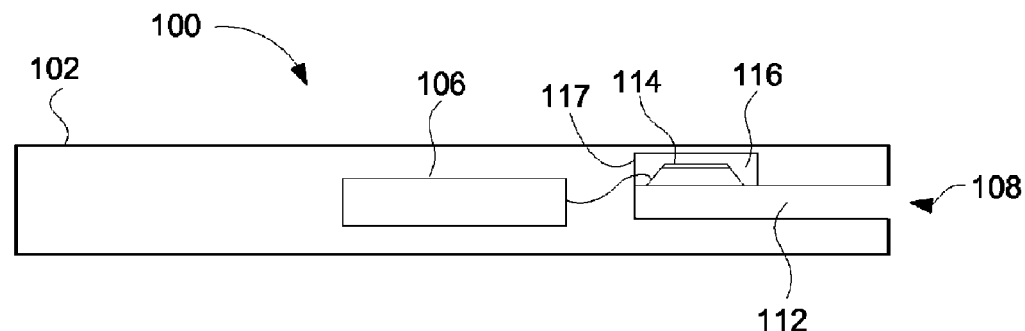
FIG. 2 is a cross-sectional side view of the portable electronic device illustrated in FIG. 1 according to one embodiment.

FIG. 2 is a cross-sectional side view of the portable electronic device 100 illustrated in FIG. 1 according to one embodiment. The cross-sectional view illustrated in FIG. 2 is a simplified view since it depicts audio components but does not depict other mechanical or electrical components that are often provided within a portable electronic device.

As illustrated in FIG. 2, the housing 102 for the portable electronic device 100 includes an acoustic chamber 112 internal to the housing 102 that couples to the audio output opening 108. The acoustic chamber 112 extends from a speaker element 114 (e.g., driver) to the audio output opening 108. The acoustic chamber 112 provides a front volume for the speaker element 114. A back volume 116 for the speaker element 114 is provided elsewhere within the housing 102. If a dedicated back volume is provided, such as illustrated in FIG. 2, an enclosure for the back chamber 116 can be provided by a dedicated cover 117, thereby forming the back volume 116. The housing 102 shown in FIG. 2 also illustrates the audio generating circuit 106 being provided internal to the housing 102 and electrically coupled to the speaker element 114. Specifically, the audio generating circuit 106 can produce audio signals (i.e., electrical signals) that are supplied to the speaker element 114 by way of an electrical connection (e.g. wire) to thereby electrically drive the speaker element 114.

Figure 3:
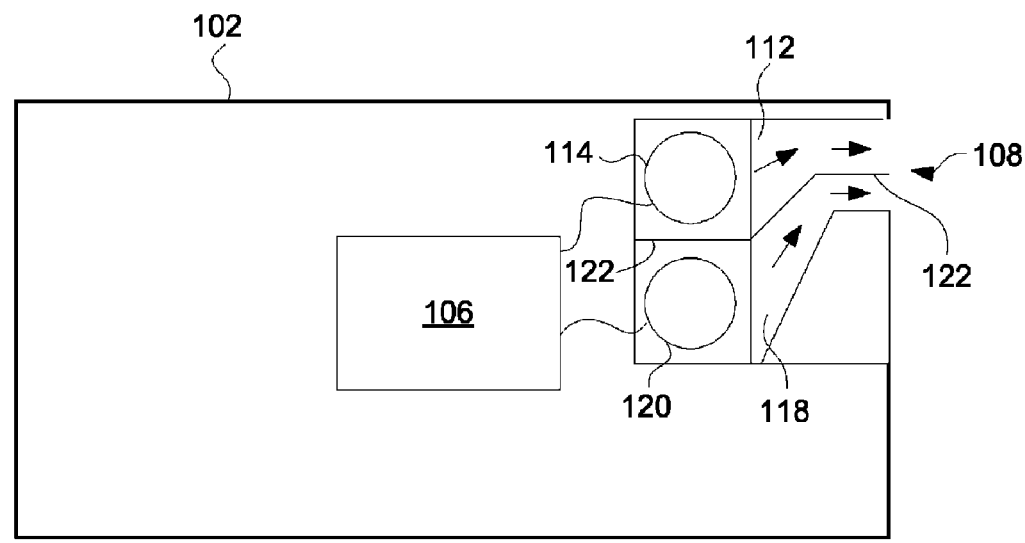
FIG. 3 is a cross-sectional top view of the portable electronic device illustrated in FIG. 2.

FIG. 3 is a cross-sectional top view of the portable electronic device 100 illustrated in FIG. 2. As clearly illustrated in FIG. 3, the housing 102 includes a speaker arrangement (or speaker system) having a pair of speaker elements 114, 120 coupled to the audio generating circuit 106. In particular, besides the speaker element 114 coupled to the acoustic chamber 112, the housing 102 also includes a speaker element 120 coupled to another acoustic chamber 118. The acoustic chamber 118 is provided proximate to (e.g. adjacent to) the acoustic chamber 112. These chambers 112, 118 are separated, or isolated, from one another by a structural barrier 122. The structural barrier 122 also causes the resulting acoustic chambers 112, 118 to both separately direct audio sound to the audio output opening 108 in the housing 102. The arrows shown in FIG. 3 illustrate the direction of audio sound passing from the respective speaker element 114, 120 through the respective acoustic chambers 112, 118 to the audio output opening 108.

Although not shown in FIG. 3, a top surface for the acoustic chambers 112, 118 can be provided by a dedicated top surface or by an inner surface of the housing 102. With a dedicated top surface, the top surface can be integrally formed with the structural barrier 122 and other sides for the chambers 112, 118. With the top surface being provided by the inner surface of the housing 102, the structural barrier 122 and other sides for the chambers 112, 118 can seal against the inner surface of the housing 102. In one embodiment, the acoustical barrier 122 includes a complaint portion (or conforming portion) that facilitate providing a reliable acoustic seal with respect to the inner surface of the top portion of the housing 102.

In one embodiment, the first speaker element 114 and the second speaker element 120 are electrodynamic drivers. A voice coil is usually used in electrodynamic drivers to produce a changing magnetic field through use of an alternating current. A diaphragm of the electrodynamic drivers moves to produce changes in air pressure (i.e., sound waves).

Since the resulting acoustic chambers 112, 118 of the speaker arrangement both separately direct audio sound to the audio output opening 108 in the housing 102, the audio sound produced by the speaker arrangement can be referred to as stereo. While the acoustic chambers 112, 118 can carry sound associated with different channels, since the audio output opening 108 is shared, the resulting effective audio sound can be multi-channel. However, in other embodiments, the audio sounds can be considered dual mono.

Figure 4:
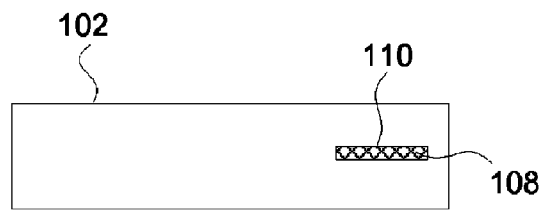
FIG. 4 is an external side view of the portable electronic device illustrating the audio output opening.

FIG. 4 is an external side view of the portable electronic device 102 illustrating the audio output opening 108. As illustrated in FIG. 4, the audio output opening 108 can include a mesh cover 110. As above, the mesh cover 110 can serve to block foreign matter from entering the audio output opening 108 in the housing 102.

Figure 5A:
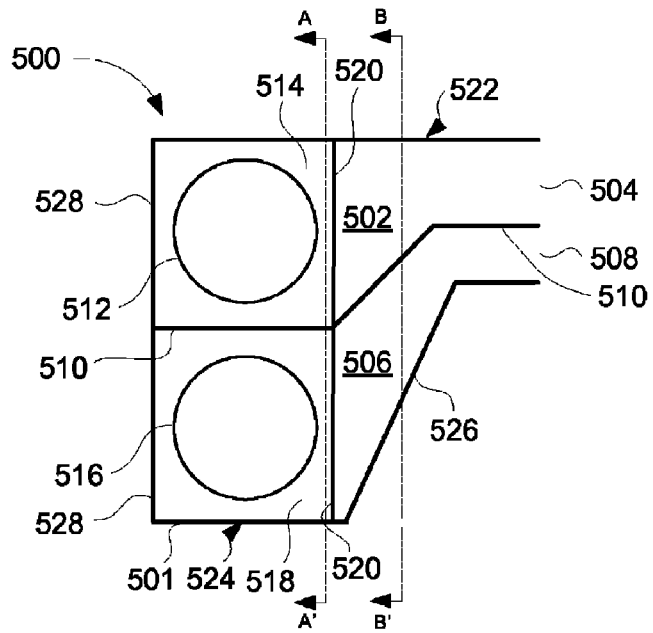
FIG. 5A is a speaker system according to one embodiment.

FIG. 5A is a speaker system 500 according to one embodiment. The speaker system 500 is, for example, similar to the speaker arrangement illustrated in FIG. 3. The speaker system 500 includes a base 501 that provides a bottom surface for the speaker system 500. The speaker system 500 supports a first acoustic chamber 502 that has an output opening 504, and a second acoustic chamber 506 that has an output opening 508. The output openings 504, 508 can also be referred to as exit openings. An acoustic barrier 510 is provided on the base 501 and positioned between the first acoustic chamber 502 and the second acoustic chamber 506. The acoustic barrier 510 can form an acoustic wall that isolates (acoustically) the first acoustic chamber 502 from the second acoustic chamber 506.

The speaker system 500 also includes a first speaker driver 512 having a back chamber 514, and a second speaker driver 516 having a back chamber 518. The back chamber 514 provides a back volume for the speaker driver 512. Similarly, the back chamber 518 provides a back volume for the speaker driver 516. The first speaker driver 512 is also acoustically coupled to the first acoustic chamber 502. The first acoustic chamber 502 provides a front volume for the first speaker driver 512. For example, the first speaker driver 512 can be adhered (e.g., glued or otherwise secured) or integral to an opening in the first acoustic chamber 502. The second acoustic chamber 506 provides a front volume for the second speaker driver 516. For example, the second speaker driver 516 can be adhered (e.g., glued or otherwise secured) or integral to an opening in the second acoustic chamber 506.

The first acoustic chamber 502 can be formed from portions of the base 501, a side wall 522, the acoustic barrier (e.g., wall) 510, a back wall 528, and a top surface. The second acoustic chamber 506 can be formed from portions of the base 501, a side wall 524, the acoustic barrier (e.g., wall) 510, the back wall 528, and a top surface. Hence, the acoustic barrier 510 is shared by both the first acoustic chamber 502 and the second acoustic chamber 506. As an example, the physical structure for the speaker system 500, such as the various walls, barriers or surfaces, can be formed of plastic (e.g., molded plastic) or other suitable materials. In one embodiment, the top surface for the first and/or second acoustic chambers 502 and 506 can pertain to a top cover (not shown). The top cover can be dedicated to the speaker system 500. In another embodiment, instead of having the top cover, the speaker system 500 can seal against a top inner surface of a housing for the electronic device that includes the speaker system 500. For example, FIG. 2 depicts a speaker arrangement within the housing 102 of the portable electronic device 100, and the top surface for the first and/or second acoustic chambers 502 and 506 can thus be provided at least in part by the surface of the housing 102. In still another embodiment, the acoustic chambers 502 and 506 can seal against one or more structures internal to the housing for the electronic device that includes the speaker system.

The back volume for the back chambers 514, 518 can be provided behind the respective speaker drivers 512, 516. The back chambers 514, 518 are typically respectively acoustically sealed to the back of the speaker drivers 512, 516. The back chambers 514, 518 are also isolated from the first and second acoustic chambers 502, 506. The back chamber 514 can be formed from portions of a wall 520, the side wall 522, the acoustic barrier 510, the back wall 528, and a top surface. The back chamber 518 can be formed from portions of the wall 520, the side wall 524, the acoustic barrier 510, the back wall 528, and a top surface.

In one embodiment, the top surface for the back chambers 514, 518 can pertain to a top cover (not shown). The top cover can be dedicated to enclosing the back chambers 514, 518. The top cover can be integrally formed with the other structural sides of the back chambers 514, 518. For example, FIG. 2 depicts a speaker arrangement within the housing 102 of the portable electronic device 100, and the enclosure for the back chamber 116 is provided by the dedicated cover 117. In another embodiment, instead of having a top cover for at least the back volumes, the back chambers 514, 518 can seal against a top inner surface of a housing for the electronic device that includes the speaker system 500. In still another embodiment, the back chamber 514, 518 can seal against one or more structures internal to the housing for the electronic device that includes the speaker system.

Figure 5B:
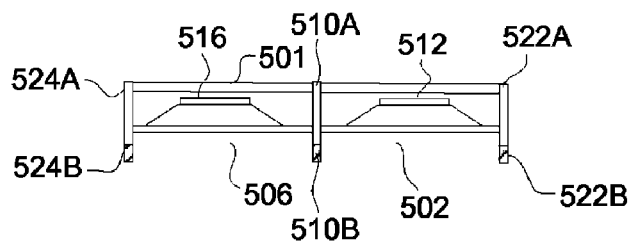
FIG. 5B is a cross-sectional view of the speaker system illustrated in FIG. 5A along section line A-A' according to one embodiment.

FIG. 5B is a cross-sectional view of the speaker system 500 illustrated in FIG. 5A along section line A-A' according to one embodiment. As shown in FIG. 5B, the acoustic chambers 502, 508 can direct audio sound from the speaker drivers 512, 516 to the output openings 504, 508, respectively. In doing so, multiple audio channels associated with the distinct speaker drivers can be maintained, yet the speaker drivers are able to be provided in close proximity to one another, such as being adjacent to one another. As a result, the sound output from the respective front volume chambers 502, 506 can be output from the housing of the electronic device at a common opening (e.g., audio output opening 108).

As further illustrated in FIG. 5B, to facilitate sealing of the speaker system 500 with respect to an inner surface of the housing of the electronic device, the acoustic barrier 510 can be fully or partially compliant. For example, as shown in FIG. 5B, the acoustic barrier 510 can be formed from a rigid barrier portion 510A and a compliant barrier portion 510B. The complaint barrier portion 510B facilitates sealing against a bottom surface or an inner surface of the housing for an electronic device. For example, the compliant barrier portion 510B can represent a gasket (e.g. foam) provided on the top of a structural member (e.g., wall) of the speaker system 500. Similarly, the side walls 522, 524 can, in one embodiment, also seal against a bottom surface or an inner surface of the housing for an electronic device. The side walls 522, 524 can be constructed to have a rigid portion 522A, 524A and a compliant portion 522B, 524B. The rigid portion 522A, 524A provides a rigid supporting structure, and the complaint portion 522B, 524B promotes acoustic sealing with respect to an opposing surface.

Figure 5C:
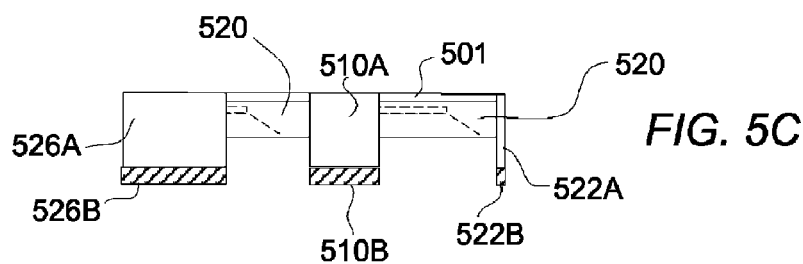
FIG. 5C is a cross-sectional view of the speaker system illustrated in FIG. 5A along section line B-B' according to one embodiment.

FIG. 5C is a cross-sectional view of the speaker system 500 illustrated in FIG. 5A along section line B-B' according to one embodiment. As shown in FIG. 5C, the speaker system 500 uses the speaker chambers 502, 506 to direct audio sound from the speaker drivers 512, 516 to the output openings 504, 508. Of particular note is that the acoustic barrier 510 isolates the respective chambers 502, 506. The acoustic barrier 510 also assists in directing audio sound to the output openings 504, 508. Also, side wall 526 serves to direct the audio sound by constricting the second audio chamber 506. To facilitate sealing of the speaker system 500 with respect to an inner surface of the housing of the electronic device, besides the acoustic barrier 510, side walls 522, 524, 526 and 528 can be fully or partially compliant. For example, as shown in FIG. 5C, the side wall 526 can be formed from a rigid portion 526A and a compliant portion 526B. The complaint portion 526B facilitates sealing against a bottom surface or an inner surface of the housing for an electronic device. For example, the compliant portion 526B can represent a gasket (e.g. foam) provided on a structural member (e.g., wall) of the speaker system 500.

Figure 5D:
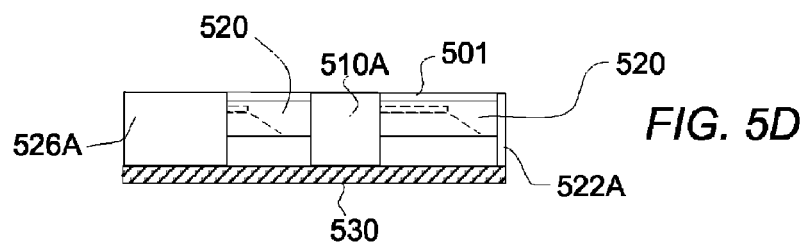
FIG. 5D is a cross-sectional view of the speaker system illustrated in FIG. 5A along section line B-B' according to another embodiment.

FIG. 5D is a cross-sectional view of the speaker system 500 illustrated in FIG. 5A along section line B-B' according to another embodiment. In this alternative embodiment, the wall 520 can define the one side of a front volume chambers 514, 518. The wall 520 can be formed from a rigid portion 520 and a compliant portion 530. The complaint portion 530 can operate to seal against a bottom surface. In this embodiment, not only can various sides 522, 524, 526 and 528 as well the acoustic barrier 510 seal against a bottom surface, but the wall 520 can similarly seal against the bottom surface using the complaint portion 530. In another embodiment, the complaint portion 530 may not be required if the front volumes all are otherwise sealed in by their own rigid structure. In still another embodiment, the compliant portion 530 together with the complaint portions 510B, 522B, 524B and 526B can be formed as an integral complaint member. The integral complaint member can operate as or be referred to as a gasket.

Figure 6:
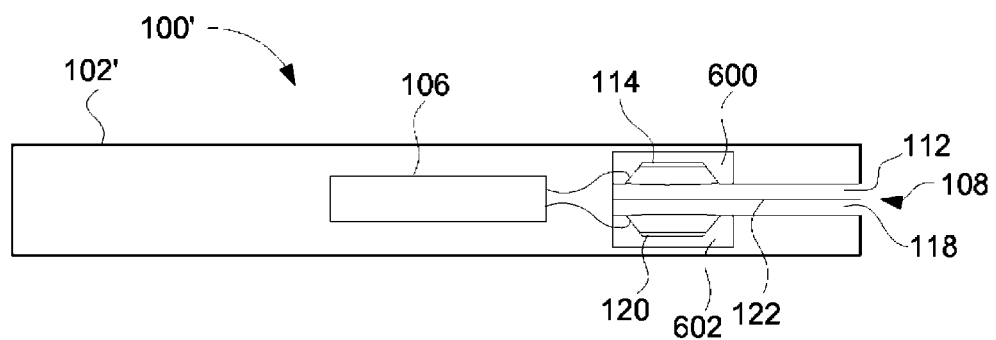
FIG. 6 is a cross-sectional side view of the portable electronic device illustrated in FIG. 1 according to another embodiment.

FIG. 6 is a cross-sectional side view of the portable electronic device 100' illustrated in FIG. 1 according to another embodiment. The cross-sectional view illustrated in FIG. 6 is a simplified view since it depicts audio components but does not depict other mechanical or electrical components that are often provided within a portable electronic device. The speaker arrangement provided in FIG. 2 is similar to the speaker arrangement illustrated in FIG. 2 except that the speaker elements 114, 120 are provided vertically adjacent one another. As illustrated in FIG. 6, the housing 102' for the portable electronic device 100' includes the acoustic chamber 112 internal to the housing 102' that couples to the audio output opening 108. The acoustic chamber 112 extends from a speaker element 114 (e.g., driver) to the audio output opening 108. The acoustic chamber 112 provides a front volume for the speaker element 114. A back volume 600 for the speaker element 114 is provided elsewhere within the housing 102. In this embodiment, the back volume 600 is provided by side walls that seal to an upper surface of the housing 102'. A back volume 602 for the speaker element 120 is also provided elsewhere within the housing 102. In this embodiment, the back volume 602 is provided by side walls that seal to a bottom surface of the housing 102'. The housing 102' shown in FIG. 6 also illustrates the audio generating circuit 106 being provided internal to the housing 102' and electrically coupled to the speaker elements 114, 120. Specifically, the audio generating circuit 106 can produce audio signals (i.e., electrical signals) that are supplied to the speaker elements 114, 120 by way of electrical connections (e.g. wires) to thereby electrically drive the speaker elements 114, 120.

Figure 7:
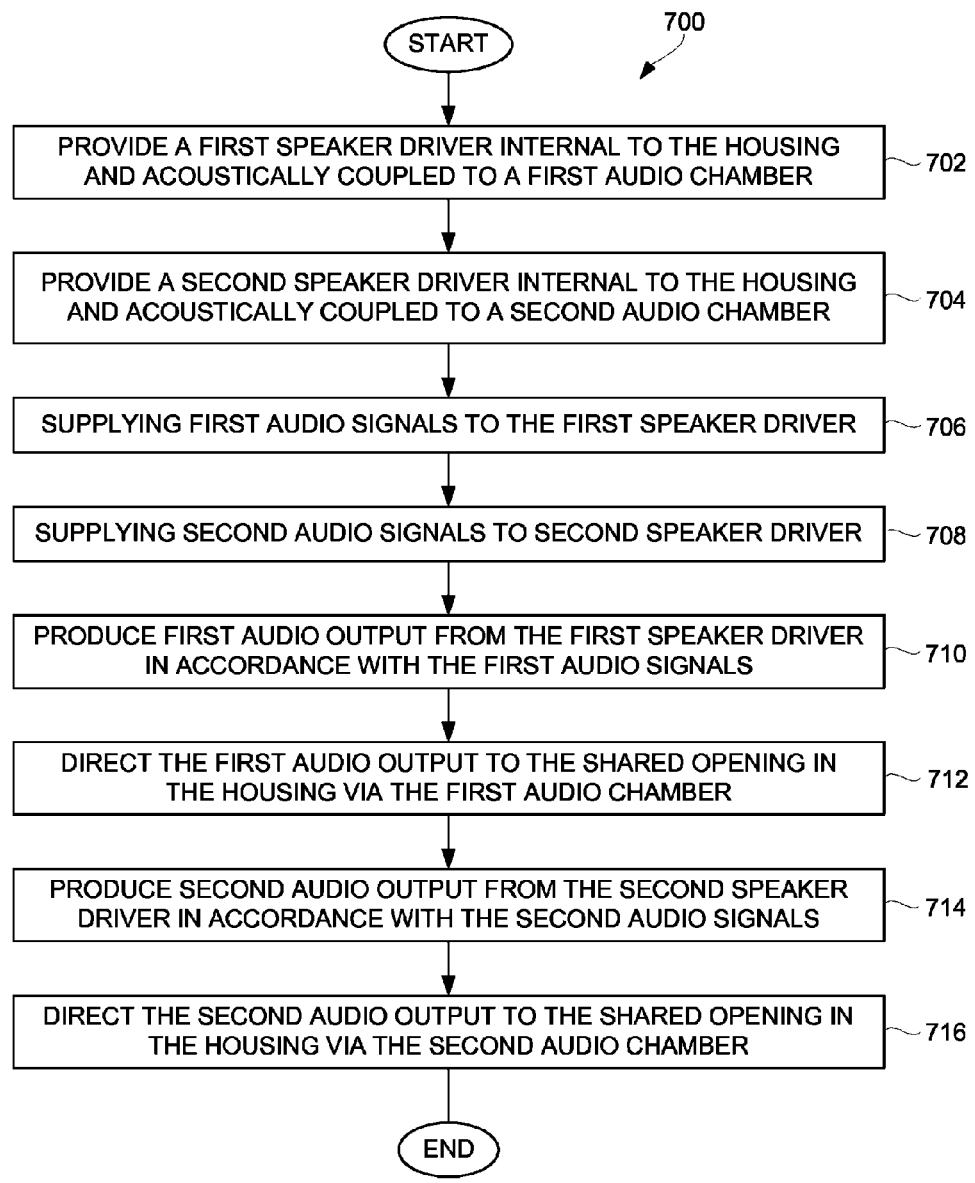
FIG. 7 is a flow diagram of a speaker operation process according to one embodiment of the invention.

FIG. 7 is a flow diagram of a speaker operation process 700 according to one embodiment of the invention. The speaker operation process 700 can, for example, operate a speaker arrangement having a plurality of speakers arranged in close proximity.

The speaker operation process 700 can provide 702 a first speaker driver. The first speaker driver is to be provided internal to a housing of a portable electronic device as part of a speaker arrangement. The first speaker driver can be arranged internal to the housing and acoustically coupled to a first audio chamber. A second speaker driver can also be provided 704. Similarly, the second speaker driver is to be provided internal to the housing of the portable electronic device as part of a speaker arrangement. The second speaker driver can be arranged internal to the housing and acoustically coupled to a second audio chamber. The housing can also have a shared output opening that is provided adjacent to output openings of the first and second audio chambers. As discussed above, the housing can also low-profile for use with compact portable electronic devices.

Once the speaker arrangement has been formed internal to the housing (including at least the first speaker driver, first audio chamber, the second speaker driver and the second audio camber), the speaker arrangement can be utilized to produce sound for a user of the portable electronic device. Accordingly, the speaker operation process 700 can, during operation, supply 706 first audio signals to the first speaker driver, and can supply 708 second audio signals to the second speaker. The first speaker driver then produces 710 first audio output in accordance with the first audio signals. The first audio output is then directed 712 to the shared opening in the housing via the first audio chamber. Similarly, the second speaker driver produces 714 second audio output in accordance in with the second audio signals. The second audio output is then directed 716 to the shared opening in the housing via the second audio chamber. Consequently, the first audio output and the second audio output are provided external to the housing by way of the shared opening. The first audio output and the second audio output can remain distinct even though the first and second audio chambers both exit from the shared opening in the housing. The resulting audio can be referred to as stereo. However, unlike classical stereo arrangements, the first and second speaker drivers are positioned proximate to one another and the resulting audio output emanates from the same shared opening. Following the block 716, the speaker operation process 710.

Figure 8:
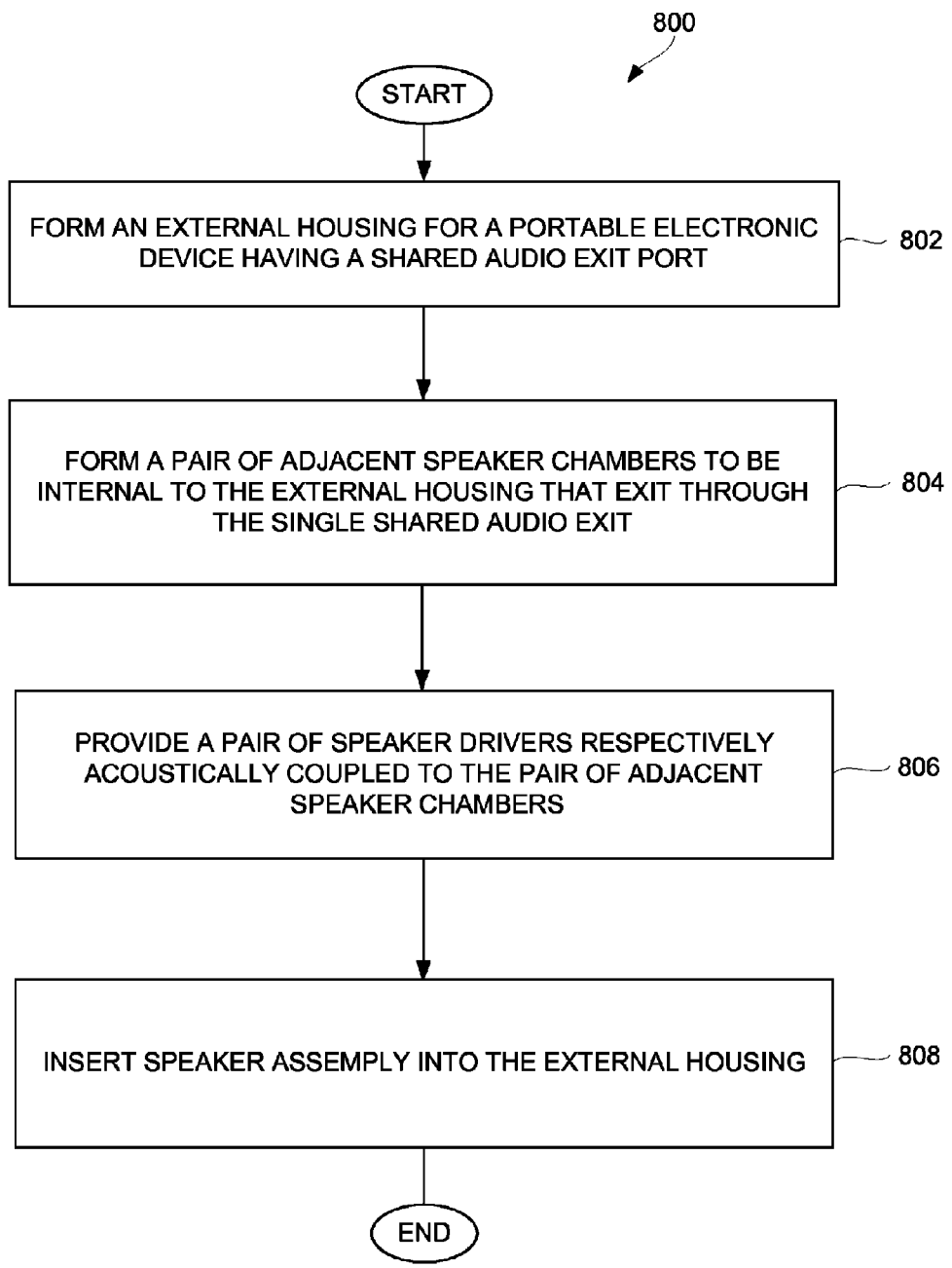
FIG. 8 is a flow diagram of a speaker arrangement formation process according to one embodiment of the invention.

FIG. 8 is a flow diagram of a speaker arrangement formation process 800 according to one embodiment of the invention. The speaker arrangement formation process 800 is, for example, processing utilized to provide a speaker arrangement within a housing for a portable electronic device.

The speaker arrangement formation process 800 can form 802 an external housing for a portable electronic device. The external housing having a shared audio exit toward from which audio will be emitted. A pair of adjacent speaker chambers can be formed 804. The adjacent speaker chambers will be eventually provided internal to the external housing so as to both exit the housing through a single shared audio exit. Additionally, a pair of speaker drivers can be provided 806 such that they are respectively acoustically coupled to the pair of adjacent speaker chambers. The resulting speaker assembly having the pair of speaker drivers and the pair of adjacent speaker chambers can then be inserted 808 into the external housing. Once the speaker arrangement is inserted 808 into the external housing, the adjacent speaker chambers are positioned so as to both exit the external housing through the single shared audio exit. Following the block 808, the speaker arrangement formation process 800 can end.

The speaker arrangements described herein are, for example, suitable for being provided internal to a housing of an electronic device. The speaker arrangements are, in one embodiment, particularly well-suited for providing speakers within a low-profile housing of a portable electronic device. Some examples of portable electronic devices include mobile telephones (e.g., cell phones), Personal Digital Assistants (PDAs), portable media players, remote controllers, pointing devices (e.g., computer mouse), game controllers, etc.

The speaker arrangements described herein are particularly well suited for used in portable electronic devices that are compact, such as compact electronic devices. In one embodiment, compact can indicates that no side is thicker than 2 centimeters. The portable electronic device can further be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

The various aspects, features, embodiments or implementations of the invention described above can be used alone or in various combinations.

Different aspects, embodiments or implementations may, but need not, yield one or more of the following advantages. One advantage of certain embodiments is that speakers can be provided in low-profile electronic device housings. As an example, adjacent acoustic chambers can be provided yet remain acoustically isolated so that multiple channels can still be supported. Another advantage of certain embodiments is that an electronic device housing has a single audio output opening for use as an exit opening for each of a plurality of acoustic chambers.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A portable electronic device, comprising:
   a housing for the portable electronic device, the housing including a shared audio output port;
   a first audio chamber internal to the housing and having a first exit opening proximate to the shared audio output port;
   a second audio chamber internal to the housing and having a second exit opening proximate to the shared audio output port;
   a first speaker driver provided in or coupled to the first audio chamber; and
   a second speaker driver provided in or coupled to the second audio chamber;
   wherein the second audio chamber is provided adjacent to the first audio chamber within the housing, such that the first audio chamber and the second audio chamber share the shared audio output port, and wherein the first audio chamber and the second audio chamber are separated by a shared internal barrier provided internal to the housing.

2. A portable electronic device as recited in claim 1, wherein the shared internal barrier acoustically separates the first audio chamber and the second audio chamber, yet participates in directing audio output from the first audio chamber to the shared audio output port and directing audio output from the second audio chamber to the shared audio output port.

3. A portable electronic device as recited in claim 1, wherein the second audio chamber is provided horizontally adjacent to the first audio chamber within the housing.

4. A portable electronic device as recited in claim 1, wherein the second audio chamber is provided vertically adjacent to the first audio chamber within the housing.

5. A portable electronic device as recited in claim 1, wherein the portable electronic device is a handheld electronic device.

6. A portable electronic device, comprising:
   a housing having an audio output opening; and
   a speaker system provided internal to the housing, the speaker system including at least:
      an acoustic chamber provided internal to the housing;
      a first speaker element and a second speaker element coupled to or disposed within the acoustic chamber and placed in close proximity to one another; and
      a compliant acoustic isolation structure disposed within the acoustic chamber and operable to isolate the acoustic chamber into first and second acoustic volumes, the first speaker element being acoustically coupled to the first acoustic volume and the second speaker element being acoustically coupled to the second acoustic volume, wherein both the first and second acoustic volumes exit at the audio output opening.

7. A portable electronic device as recited in claim 6, wherein the compliant acoustic isolation structure comprises a compliant barrier.

8. A portable electronic device as recited in claim 7, wherein at least a portion of the compliant barrier is compliant.

9. A portable electronic device as recited in claim 7, wherein at least a portion of the compliant barrier comprises a foam barrier or gasket.

10. A portable electronic device as recited in claim 6, wherein the first speaker element and the second speaker element are electrodynamic drivers.

11. A portable electronic device as recited in claim 6, wherein the portable electronic device is a handheld electronic device.

12. A portable electronic device as recited in claim 6, wherein the thickness of the portable electronic device is less than 2 centimeters.

13. A portable electronic device as recited in claim 6, wherein the audio output opening is provided by at least a plurality of micro-perforations in the housing wall.

14. A portable electronic device as recited in claim 6, wherein the audio output opening of the housing is covered with a mesh structure.

15. A portable electronic device as recited in claim 6, wherein the acoustic chamber provided internal to the housing is defined at least in part by a surface of the housing and exiting at the audio output opening.

16. A method for assembling a portable electronic device, said method comprising:
   forming an external housing for a portable electronic device having a shared audio exit port;
   forming a pair of adjacent speaker chambers internal to the external housing that exit through the single shared audio exit port of the external housing;
   providing a pair of speaker drivers respectively acoustically coupled to the pair of adjacent speaker chambers; and
   providing a separation wall to separate and isolate the adjacent speaker chambers from each other.

17. A method as recited in claim 16, wherein the separation wall acoustically seals against a portion of an inner surface of the external housing.

18. A method as recited in claim 16, wherein the separation wall acoustically seals to another surface using a compliant sealing material.

19. A method as recited in claim 16, wherein the compliant sealing material comprises a foam.

20. A method for outputting audio sound from a housing of a portable electronic device, said method comprising:
   providing a first speaker driver internal to the housing and acoustically coupled to a first audio chamber, the first audio chamber having an exit opening corresponding to a shared opening in the housing;
   providing a second speaker driver internal to the housing and acoustically coupled to a second audio chamber, the second audio chamber having an exit opening corresponding to the shared opening in the housing, wherein the first audio chamber and the second audio chamber are provided adjacent to one another and are separated at least in part by an acoustic barrier;
   supplying first audio signals to the first speaker driver;
   supplying second audio signals to second speaker driver;
   producing first audio output from the first speaker driver in accordance with the first audio signals;
   directing the first audio output to the shared opening in the housing via the first audio chamber;
   producing second audio output from the second speaker driver in accordance with the second audio signals; and
   directing the second audio output to the shared opening in the housing via the second audio chamber.

21. A method as recited in claim 20, wherein the first audio chamber and the second audio chamber are parts of a multi-part acoustic chamber having a first part corresponding to the first audio chamber and a second part corresponding to the second audio chamber.

22. A method as recited in claim 21, wherein the first part and the second part of the multi-part acoustic chamber are adjacent one another.

23. A method as recited in claim 22, wherein the first part and the second part of the multi-part acoustic chamber are acoustically separated by at least one acoustic barrier.

24. A method as recited in claim 20, wherein the first audio signals pertain to a left channel, and wherein the second audio signals pertain to a right channel.

* * * * *